July 21, 1964 W. C. WOOTTON 3,141,488
LOCKING NUT ASSEMBLY
Filed Feb. 8, 1961
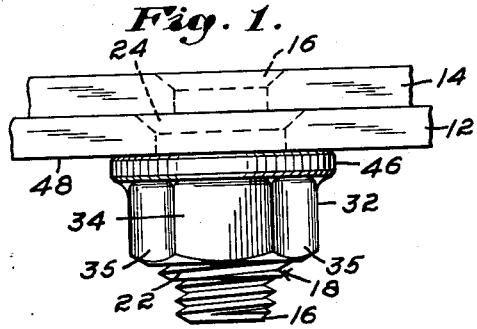
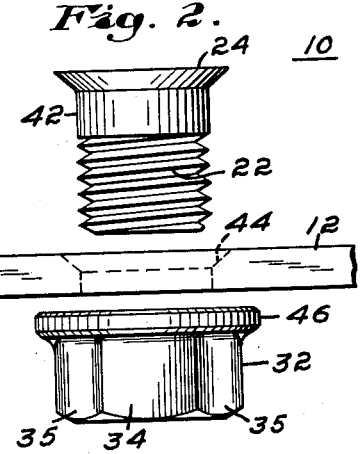
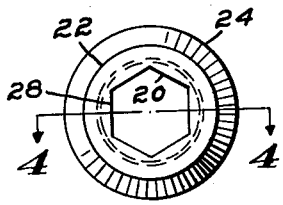
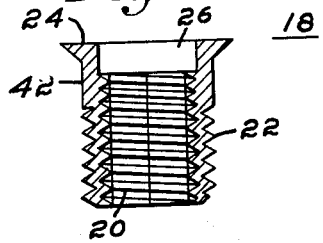
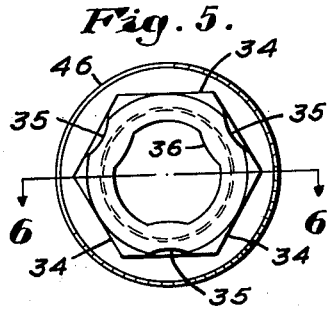
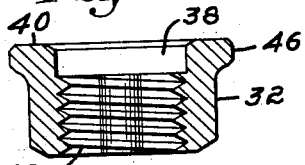
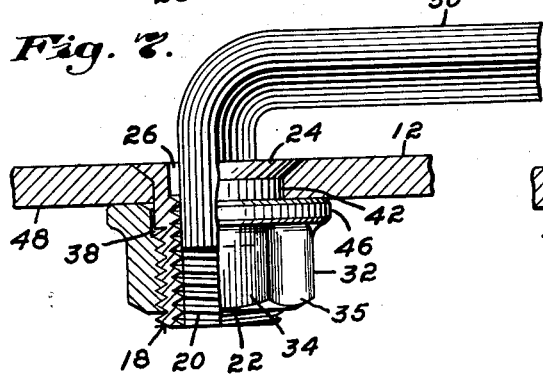
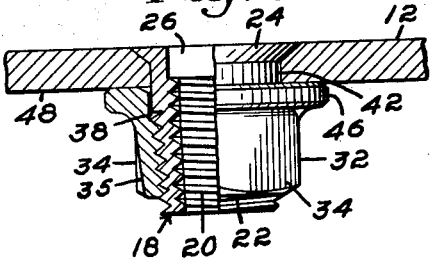
Inventor:
William C. Wootton,
by James B. Tiffany Jr. Att'y.

United States Patent Office 3,141,488
Patented July 21, 1964

3,141,488
LOCKING NUT ASSEMBLY
William C. Wootton, Fremont, Calif., assignor to United-Carr Incorporated, a corporation of Delaware
Filed Feb. 8, 1961, Ser. No. 87,941
1 Claim. (Cl. 151—21)

This invention relates generally to fastening devices and in particular to a captive self-locking fastener.

In many instances, it is necessary to provide a locking captive nut assembly and heretofore clip type nuts have generally been used in the industry. This type of a nut has generally proved to be objectionable because a portion of the clip is positioned between the panels with a resultant spacing of the panels and, furthermore, they are restricted to the edges of panels or in specifically formed sections.

This invention was designed to overcome these objectionable features and provide a flush lightweight self-locking nut that can be installed with ordinary tools in a single countersink hole in any application area.

A further object of this invention is to provide a two piece self-locking fastener adapted for pre-assembly on a panel.

Other objects of the invention will, in part, be obvious, and will, in part, appear hereinafter.

In the drawings:

FIG. 1 is a view in front elevation of the fastener holding two panels in assembly;

FIG. 2 is an exploded view of the components of the assembly;

FIG. 3 is a bottom plan view of the bushing of FIG. 2;

FIG. 4 is a view in section taken on line 4—4 of FIG. 3;

FIG. 5 is a bottom plan view of the locking nut illustrated in FIG. 2;

FIG. 6 is a view in section taken on line 6—6 of FIG. 5;

FIG. 7 is a view in elevation, partly in section of the bushing and locking nut assembled with the panel with an Allen wrench illustrating one phase of the installation;

FIG. 8 is a view in elevation, partly in section of the bushing and locking nut assembled with the panel illustrating the action of the lock nut on the bushing.

Referring to the drawings, there is illustrated a self-locking nut assembly 10 adapted for installation in an apertured panel 12 to retain a second panel 14 in abutting relationship by means of a threaded member 16.

The nut assembly 10 includes a bushing 18 having internal 20 and external threads 22 formed thereon. It should be noted that the internal and external threads are in phase with the crests of the outer threads opposing the roots of the inner threads to insure a constant wall thickness and maximum strength on the relatively thin wall available. As illustrated in FIGS. 3 and 4, the bushing has a flared head 24 with an internally recessed portion 26 with the internal threads 20 broached or formed to a hexagonal shape having flats 28 to receive an Allen wrench 30 or the like for a purpose to be described hereinafter.

Referring to FIGS. 5 and 6, there is illustrated the retaining nut 32 of the assembly and comprises an internally threaded body which may be of the usual hexagonal form having one or more of the faces 34 having a detent 35 formed therein causing an inward displacement of the internal threads 36. A counterbored portion 38 is formed within one end 40 of the nut 32 adapted to accumulate the grip or unthread portion 42 of the bushing.

The entire nut assembly has been designed for assembly in a captive position on a panel. To assemble the components on a panel, the bushing 18 is inserted through the apertured panel 12 with the flared head 24 lying within the countersink 44 of the panel. An Allen wrench is fitted within the internally broached threads 20 to prevent the bushing 18 from rotating during the threading of the retaining nut 32. The retaining nut 32 is threaded on the external threads 22 of the bushing, 18 using a conventional wrench (not shown), and tightened securely.

It will be seen by referring to FIG. 8 that the nut portion 32 has a flange 46 which butts against the undersurface 48 of the panel 12 preventing overstressing of the bushing 18. The function of the retaining nut 32 is to transmit its locking torque developed by the indented portion 36 of the face 34 to the thin walled bushing 18 which in turn transmits the locking feature to a threaded bolt member 16. This transmittal of the locking torque will distort the bushing 18 out of round. As shown in FIG. 1, a complementary panel 14 having a threaded bolt member 16 inserted therethrough may be secured to the first panel 12 in such a manner to resist vibratory loosening of the nut assembly.

By utilizing a nut assembly having the particular features of my invention there is provided a locking fastener which is capable of being reused without permanent deformation of any of the components and which may be simply and easily installed on any support.

Since certain other obvious modifications may be made in this device without departing from the scope of the invention, it is intended that all matter contained herein be interpreted in an illustrative and not in a limiting sense.

I claim:

A locking nut assembly comprising, in combination, a support part having an aperture therein, a hollow bushing having an initially cylindrical continuous thin wall of constant thickness and having internal and external threads with initially uniform major and minor diameters throughout the length of said threads, and said bushing having a flared head fitting flush into said aperture, a continuous walled nut threaded onto the external threads of said bushing, a part to be attached to said support part and a screw member threaded into the internal threads of said bushing and holding the said part to said support part, and locking detent means being formed as a part of said nut consisting of circumferentially spaced inwardly distorted sidewalls on said nut forming inwardly set thread portion, said bushing being distorted to a non-circular configuration by said nut side walls, said nut having throughout its length uniform major and minor diameters across the undistorted threaded portion, and whereby the locking torque developed by said detent means on said nut is transmitted to said thin walled bushing and thereby transmitted to said screw member to lock the parts against accidental separation.

References Cited in the file of this patent

UNITED STATES PATENTS

| | | |
|---|---|---|
| 579,848 | Thompson | Mar. 30, 1897 |
| 1,139,671 | Goodall | May 18, 1915 |
| 1,251,676 | McCaffray | Jan. 1, 1918 |
| 1,431,076 | Yungkruger | Oct. 3, 1922 |
| 1,721,313 | Nelson | July 16, 1929 |
| 2,051,066 | Anderson | Aug. 18, 1936 |
| 2,575,641 | Summers | Nov. 20, 1951 |
| 2,788,044 | Dock | Apr. 9, 1957 |
| 2,897,867 | La Torre | Aug. 4, 1959 |
| 2,984,279 | Rosan | May 16, 1961 |
| 3,034,611 | Zenzic | May 15, 1962 |

FOREIGN PATENTS

| | | |
|---|---|---|
| 666,155 | France | May 14, 1929 |
| 162,216 | Switzerland | June 15, 1933 |